Feb. 9, 1943.  G. H. CLARK  2,310,516
VALVE
Filed Feb. 10, 1940  2 Sheets-Sheet 1

INVENTOR
George H. Clark.
BY
ATTORNEY

Patented Feb. 9, 1943

2,310,516

UNITED STATES PATENT OFFICE 2,310,516

VALVE

George H. Clark, Washtenaw County, Mich., assignor to Square D Company, Detroit, Mich., a corporation of Michigan Application February 10, 1940, Serial No. 318,258

4 Claims. (Cl. 137—139)

This invention relates to valves and more particularly to a pilot controlled valve of relatively high capacity as compared with the pilot valve which controls it.

The invention has for its object an improved form of valve of high capacity susceptible to fine control from a light pilot valve and which shall be of rugged and dependable construction with improved operating characteristics.

Other objects and features of this invention will be readily apparent those skilled in the art from the specification and appended drawings illustrating certain preferred embodiments in which.

Figures 1, 2:
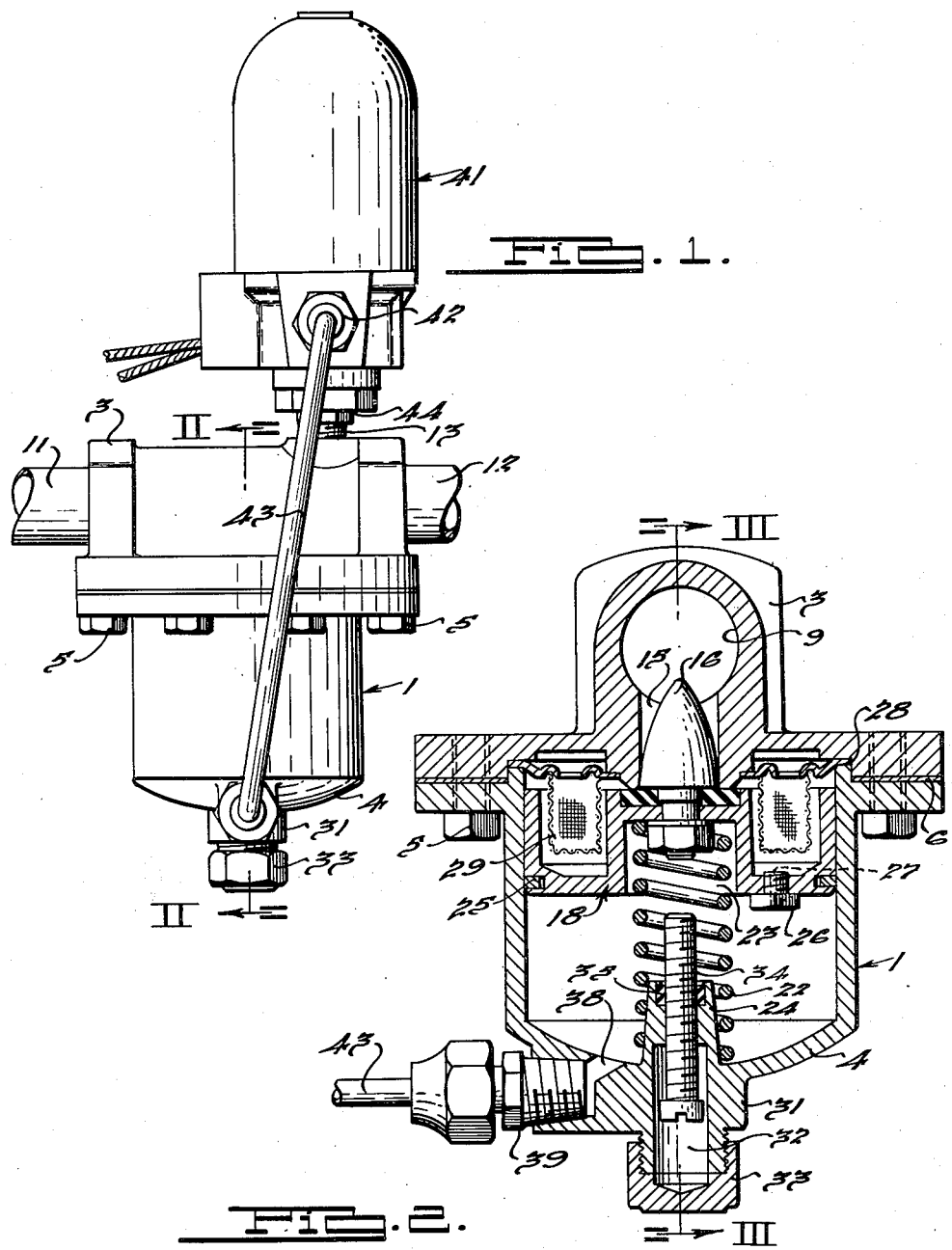
Figure 1 is an elevational view of the combined main valve and pilot valve.
Figure 2 is an enlarged elevational sectional view taken on the line II—II of Figure 1.
Figure 3:
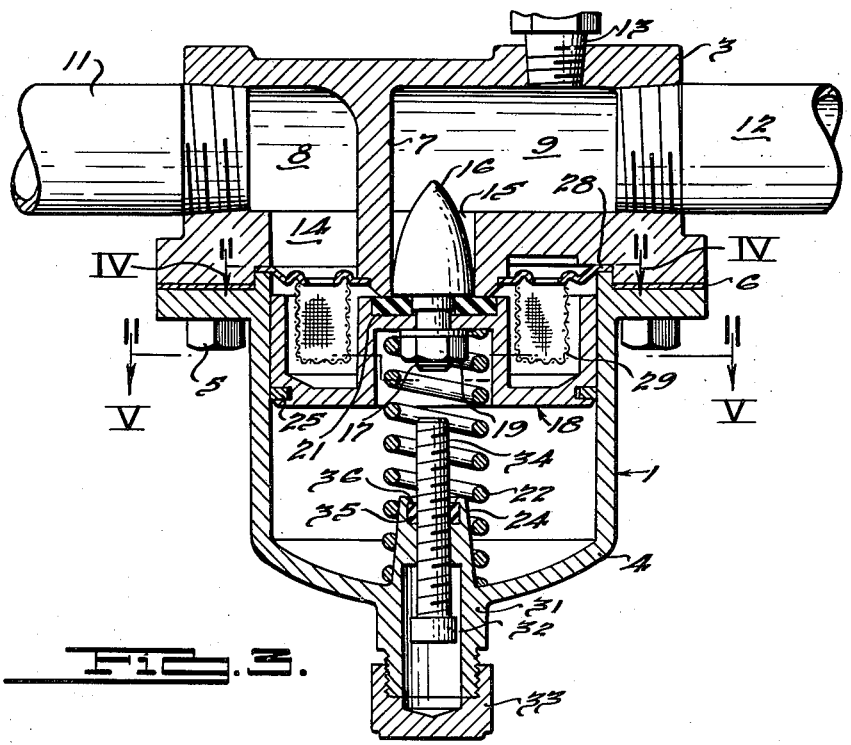
Figure 3 is a sectional view taken on the line III—III of Figure 2.
Figures 4, 5:
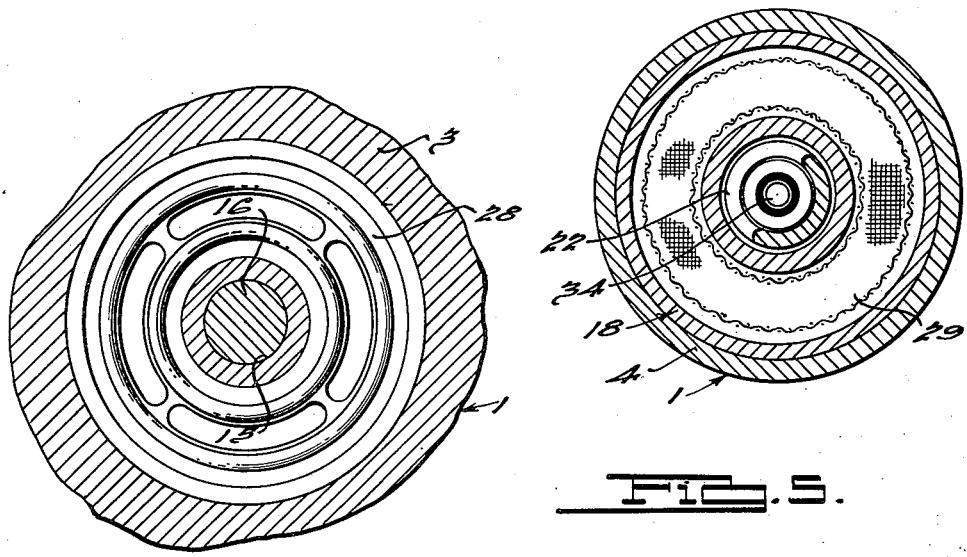
Figure 4 is a sectional view taken on the line IV—IV of Figure 3.
Figure 5 is a sectional view taken on the line V—V of Figure 3.

The valve 1 according to the present invention comprises a valve housing made up of an upper casing member 3 and a lower casing member 4, with said casing members being joined together as by studs 5 and with an annular gasket 6 disposed therebetween to prevent leakage. The upper casing member 3 is divided by a partition wall 7 into valve chambers 8 and 9 with an inlet connection 11 leading to chamber 8 and an outlet connection 12 leading from chamber 9. An auxiliary entrance connection 13 is provided into chamber 9, as will be hereinafter explained. A communicating chamber 14 leads from chamber 8 into the lower casing member 4 with a second communication chamber 15 leading therefrom into chamber 9. Thus, fluid coursing through valve 1 enters chamber 8 and flows therefrom through the communicating chamber 14 around the partition wall 7 and thence through communicating chamber 15 into chamber 9. The flow of fluid through the device is controlled by a valve member 16 movable into and out of the communicating chamber 15 to seal or open the same. A piston 18 adapted to reciprocate within lower casing member 4 is provided with an opening in the base thereof through which extends the threaded extremity 17 of the valve member 16. A nut 18 fitted onto said extremity 17 thereby secures the valve member 16 to the piston member 18. A gasket 21 is carried by the piston within a recess in its upper face 18 and in intimate contact with the valve member to prevent leakage therearound.

The valve member 16 is urged upwardly toward closed position by a compression spring 22, the upper extremity of which is disposed within a recess 23 provided at the back of the base of the piston and the lower extremity of which is disposed about an annular guide sleeve 24 extending upwardly from the base of the lower casing member 4. The piston carries a piston ring 25 which is fitted into a recess provided at the outer wall thereof and which restricts bleeding of fluid from the upper casing member 3 into the lower casing member 4. A stud 26 having an aperture 27 therethrough is carried by the piston to controllably bleed fluid from above the piston to below it. To provide for a faster or a slower bleeding of fluid about the piston, it is only necessary to substitute a stud having a larger or smaller aperture therethrough.

Disposed between the upper and lower casing members 3 and 4 is an annular screen or strainer 29 disposed to lie directly in the path of fluid flow from chamber 8 to chamber 9 and serving to catch and restrain any foreign matter entering at the inlet. The piston is recessed to receive the screen within the confines of its defining walls so that its upward movement is not interfered with by the screen.

The lower casing member 4 is provided with a protruding portion 31 at the exterior thereof having an opening 32 extending therethrough and through the guide sleeve 24. A sealing cap 33 is threaded upon said projected portion 31 to close the opening.

Threaded through the guide sleeve 24 and extending into the interior of casing member 4 is a stud 34 whose upper end is adapted to be engaged by the end of the extension 17 on valve member 16 when valve and piston move downwardly to thereby determine the extent to which said valve member 16 may move out of the communicating passage 15. This construction provides a means of controlling any fluid surges through the device that may develop through the presence of unfavorable conditions in the system to be controlled, for the valve member 16 through its being engaged by the stud 34 will move out of the communicating chamber 15 only a determined amount whether or not a condition conducive to surging exists in the system and therefore only the desired amount of fluid may be passed. Thus, by setting the stud 34 at the proper point the valve may be adjusted to the capacity of the system to be controlled and surging will be eliminated. A gasket 35 is disposed about said stud 34 and within a recess 36 provided in said guide sleeve 24 to prevent leakage. With the removal of the sealing cap 33 access may be had to said stud 34 to manipulate the same and move it closer to or further away from the valve member 16. The stud 34 is of sufficient length that it can be rotated to engage the extremity 17 when the valve member 16 is in closed position to retain said member 16 in said position and thereby providing in effect a shut off valve in the system to be controlled.

An outlet passage 38 is provided adjacent the bottom of casing member 4 leading to an outlet connection 39 whereby fluid present below the piston may be released.

The valve 1 as above described is adapted to be used in conjunction with a pilot valve, the operation of said main valve 1 being controlled by the pilot valve which is adapted to be affected at will or by predetermined changes in an external condition or in a condition in the fluid system to be controlled. The use of these valves in this manner results in an economic and effective control of heavy pressure and volumes of fluid since only the main valve need be of sufficiently heavy construction. The type of valve action that may be obtained may be either modulating or full open and full closed, depending upon the pilot valve used. If an automatic expansion valve were used, a modulating action would be obtained as will hereinafter be described and with the use of a solenoid valve, as depicted in Figure 1, a full open and full closed type of service is obtained.

Figure 1 presents a pilot valve system in which a solenoid valve 41 has its inlet 42 connected by a by-pass line 43 to the outlet connection 39 of the main valve 1 and has its outlet 44 connected to the main valve auxiliary connection 13. With the solenoid valve 41 closed and with the valve member 16 in closed position, the operation of the system is as follows: Upon energization of the solenoid valve 41, the by-pass line 43 will be opened to allow the passage of fluid from below the member 18 through the by-pass line 43, through the solenoid valve 41 and into the outlet chamber 9 of the main valve 1 reducing the pressure acting upon the lower surface of piston member 18 to the value of the pressure in the outlet chamber 9. While the pressure below the piston member 18 is reduced, the upper surface of said piston member remains subjected to the inlet pressure, the differential in pressure being sufficient to effect a downward movement of the piston. With the downward movement of the piston, the valve member 16 is unseated to permit the passage of fluid through the main valve 1. Upon a deenergization of the solenoid coil, the by-pass 43 will be closed and fluid entering at the inlet will bleed around the piston and through the orifice 27 to build up pressure in the chamber of casing member 4, until the point is reached at which the sum of this pressure and of the pressure exerted by the spring exceeds the inlet pressure, whereupon the piston will be moved upwardly to carry the valve member 16 into closed position thereby cutting off the flow of fluid. To change the time required to build up sufficient pressure to close the valve, it is necessary only to substitute for stud 26 a stud having a different size orifice therethrough to change the rate of bleeding of the fluid to the chamber below the piston.

To obtain a modulating type of action in the system, an automatic expansion valve will be used as a pilot valve, the main valve assuming the modulating action of the expansion valve. The automatic expansion valve may be set to regulate at any desired outlet pressure, and with the building up of the outlet pressure to this predetermined value the expansion valve closes to effect closing movement of the valve member 16; with the closing of valve member 16, the value of the outlet pressure falls and the automatic expansion valve reopens to thereby bring about opening movement of the valve member 16. Thus, an action is obtained in which the main valve 1 modulates to maintain a given outlet pressure as determined by the setting of the automatic expansion valve.

While certain preferred embodiments of this invention have been specifically disclosed, it is understood that the invention is not limited thereto, as many variations will be readily apparent to those skilled in the art and the invention is to be given its broadest possible interpretation within the terms of the following claims:

What is claimed is:

1. In a valve structure, a valve casing having an inlet chamber and an outlet chamber with a communicating passage therebetween, a conoidal shaped valve movable into and out of said communicating passage, a pressure responsive member actuable to move said valve, means carried by the valve casing and having an interfitting engagement with said pressure responsive member for restraining the passage for foreign matter through the valve structure, a spring member exerting its bias to urge said valve into closed position, an element carried by said valve casing to serve as a stop for said valve member, said stop element being engageable by said valve member upon movement of said valve member out of said communicating passage to thereby determine the extent of movement of said valve member out of said passage, said stop element being adjustable to permit a greater or lesser movement of said valve member.

2. In a valve structure, a valve casing, a partition therein establishing an inlet chamber and an outlet chamber, a communicating passage therebetween, a conoidal shaped valve member movable into and out of said communicating passage to close and open the same, a screened member disposed in the path of the flow of fluid from said inlet chamber to said outlet chamber, a piston member carrying said valve member and being adapted to be acted upon by the pressure of the fluid entering at the inlet chamber to move said valve to open position, said piston member having an opening therein to receive said screened member in the closed position of the valve, a spring member exerting its bias to urge said valve member to closed position, means carried by said piston member whereby fluid entering at the inlet may be directed around said piston to exert a pressure upon it in a direction opposite to the direction of said fluid flow whereby the combined spring pressure and said fluid pressure is sufficient to overcome said inlet pressure to carry the valve member into closed position, an element carried by said valve housing and adapted to serve as a stop for said valve member, said stop element being engageable by said valve member to define the amount of opening movement and thereby determine the amount of fluid flow, said stop element being adjustable to permit a greater or lesser opening movement of said valve member and thereby a greater or lesser amount of fluid flow.

3. In a valve system, a valve structure comprising a valve casing having an inlet chamber and an outlet chamber with a communicating passage therebetween, a conoidal shaped valve member movable in said communicating passage to regulate the flow of fluid therethrough, a piston actuable to move said valve member, means having a telescoping engagement with said piston for restraining the passage of foreign matter through the valve structure, a spring member acting upon said piston and exerting its bias to urge said valve member into closed position, means carried by said piston whereby fluid may be bled through said piston to induce a pressure upon said piston acting in the same direction as does the spring member until the sum of the combined forces are sufficient to move said piston to carry the valve member to closed position, an element carried by said valve casing and adapated to serve as a stop for said valve member, said stop element being engageable by said valve member to define the amount of movement thereof and thereby determine the amount of fluid flow, said stop element being adjustable to permit a greater or lesser opening movement of said valve member, said valve casing having an outlet passage therein on the side of the piston to which the fluid is bled, and means connected to said outlet passage and automatically operable under predetermined conditions to open said outlet passage to relieve the pressure upon said piston whereby the pressure of the fluid in the inlet chamber is sufficient to move said piston and said valve member to open position against the force of said spring member.

4. In combination, a valve structure comprising a casing having an inlet and an outlet in direct line, a valve for controlling communication therebetween, a piston actuable to move said valve, means carried by said casing and having an interfitting engagement with said piston for restraining the passage of foreign matter through the valve structure, spring means urging said valve into closed position, removable means carried by said piston and having an orifice therethrough whereby fluid may be bled through said piston to induce a pressure upon said piston to effect movement thereof in a direction opposite to the direction of said fluid movement to carry the valve into closed position, and an adjustable member supported by said casing and adapted to define the amount of opening movement of said valve to thereby determine the amount of fluid flow.

GEORGE H. CLARK.